Patented Dec. 29, 1931

1,838,810

UNITED STATES PATENT OFFICE

THOMAS S. CURTIS, OF HUNTINGTON PARK, CALIFORNIA, ASSIGNOR, BY MESNE ASSIGNMENTS, TO KELCO COMPANY, OF SAN DIEGO, CALIFORNIA, A CORPORATION OF DELAWARE

PLASTICIZING PROCESS FOR CERAMIC COMPOSITIONS OF FEEBLE PLASTICITY AND PRODUCT RESULTING THEREFROM

No Drawing. Application filed July 30, 1928. Serial No. 296,406.

In the art of ceramic manufacture, it has long been realized that the technique of molding, pressing, etc. would be greatly facilitated if some means of increasing or controlling plasticity or "moldability" of the batch were available.

In an effort to study the causes of plasticity or lack of it, I have utilized the stereobinocular microscope with carefully regulated light sources to give monochromatic values, and have incorporated with the water of the mixture, certain dyes that are completely soluble in water, in order to be able definitely to trace the water in the batch and to study its effects upon various microscopic particles manipulated by means of a micro-manipulator under full stereoscopic vision at from 50 to 250 diameters.

This technic has enabled me to study the phenomenon of surface tension, viscosity, etc. and to trace the course of the water as plasticity is increased or decreased by means of increased or decreased viscosity and surface tension.

The study of the plastic clays which represent the ideal in all plastic compositions has shown that the function of plasticity is very largely a matter of viscosity and surface tension. It has also shown clearly why the usual organic bonds such as glue, dextrin, etc. are of little or no practical value as strengtheners or plasticizers. The reason for the failure of such organic materials is seen in the tendency for the highly soluble glue or dextrin to migrate through the pores along with the water as the latter leaves the body under drying heat, only to form a case-hardened skin or crust upon the outside of the article after the water has evaporated.

The colloidal constituent of natural clay, on the other hand, gives up its water content readily without displacement from its original position in the mass as a cementitious magma which coats the grains of non-plastic material causing them to cohere firmly in the dried article, the strength of the dried article in the green state being directly proportional to the percentage of this colloidal magma in the original composition.

My study of the mechanics of plasticity has convinced me that the latter is dependent upon the formation of a gel within the interstices of the mass. It is exactly this occurence which is so graphically depicted by the micro technique I have briefly described. Therefore, in an effort to find an organic substitute for the natural colloid in plastic clay, I searched for substances which had the property of absorbing water in the formation of a gel but which would not migrate through the pores of a granular mass with the water as the latter was expelled by drying heat. In the appended claims, the term "gel globule producing substance" is used to designate such a substance as above set forth.

This condition is faithfully met by the ammonium salt of alginic acid, an organic compound manufactured from the kelp occurring off the southern California coast. The substance is manufactured initially in the form of a paste containing from 9 to 15% solids, the rest being water.

In ceramic batches having little or no plasticity and intended for use at once either as batches for hand molding or machine pressing, just sufficient water is added to the dry constituents of the ceramic batch to coat the grains thereby forming a damp powder of about the consistency of ordinary foundry molding sand. This dampening of the batch is best accomplished in a mixing machine of the wet pan or muller type. As soon as the batch has been uniformly dampened as evidenced by its tendency to pack when squeezed in the hand, the ammonium alginate paste is added in any desired percentage depending upon the degree of plasticity subsequently to be realized. The paste is readily broken down by the mullers of the pan and kneaded or mulled into the damp ceramic batch. After a few minutes of tempering, the distribution of the alginate is complete and examination of the mass under a stereo-microscope will show that each particle of the non-plastic solids of the batch is coated with an aqueous cement having the properties of a gel. In short the viscosity and surface tension of the water have been increased to such an extent that it affords a more or less viscous bond or cement for the non-plastic grains.

If the batch is to be molded by mechanical or hydraulic pressure it may be used in the above described condition of a damp powder. Batches so totally devoid of plasticity that they cannot be pressed into complicated molds or dies, are through this plasticizing agency, rendered so plastic that they will flow with excellent distribution of density into the furthermost corners of a complicated mold.

If it is desired to mold the batch by what is known as hand molding or pressing, additional water may be incorporated in the batch in the tempering pan until the desired degree of viscosity is affected exactly as in tempering ordinary clay.

The percentage of ammonium alginate to be added depends upon the initial plasticity of the ceramic batch, the fineness of grind of the latter and upon the molding or forming process it is desired subsequently to employ. As an example which is quoted merely for illustration and not with a desire to limit the principle to any given percentage, it may be stated that two percent of the ammonium alginate paste is sufficient to bring a totally nonplastic batch of finely ground kyanite or silica sand to a degree of plasticity that enables it to be formed in a plaster mold by ordinary hand pressing with as great an ease as is the usual clay batch of so-called "short" working qualities. Five percent of alginate paste will bring the same batch to a degree of moldability that satisfies the most fastidious potter.

Unlike the appreciable thickness of the cementing film of plastic clay, the viscous organic cement produced by the absorption of water in the ammonium alginate globule is extremely thin and as a result it permits the particles of refractory material to pack very closely together resulting in a structure of low inherent pore volume thereby lessening the tendency to shrink as the temperature is increased.

Exactly the same advantage may be found in the practice of this invention in the manufacture of tile, domestic electric heating appliance refractories, and other ceramic shapes which must be made to an accurate finished size. The elimination of clay from the body composition makes it possible to form such articles with practically one hundred per cent of hard, dense, non-shrinking particles thereby eliminating at once the variable which gives rise to so much trouble as a result of the varying shrinkage and plasticity of common clays.

While ammonium alginate has been referred to throughout in this specification as the preferred means whereby the property of plasticity may be imparted to otherwise nonplastic ceramic bodies, I do not wish to be limited to the use of this salt, as other gel producing substances derived from marine algae may be employed. I have specified ammonium alginate as it is relatively cheap, and can be made in unlimited quantities since the ocean produces the basic raw material in renewed crops as fast as one is harvested. It will be obvious, therefore, that all substances having the plasticizing properties of ammonium alginate are to be regarded as functional equivalents of ammonium alginate, and are to be included in the construction of claims specifying ammonium alginate.

The above specifically mentioned materials are, therefore, to be regarded as illustrative only of the materials which can be employed in accordance with this invention, and it will, therefore, be understood that it is intended to embrace within the scope of this invention such modifications and changes as may be necessary to adapt it to varying conditions and uses.

Having thus described my invention, what I claim as new and desire to secure by Letters Patent of the United States, is:—

1. In a ceramic composition of the class described, the combination with a substance of feeble plasticity of a salt of alginic acid.

2. In a ceramic composition of the class described, the combination with a substance of feeble plasticity of ammonium alginate.

3. A ceramic composition of the class described, comprising, in combination, finely ground kyanite and ammonium alginate.

4. A ceramic composition of the class described, comprising, in combination, 98% kyanite and 2% ammonium alginate.

5. A ceramic composition of the class described, consisting of a dampened powder of ceramic material to which has been added the paste of ammonium alginate.

6. A ceramic composition of the class described, consisting of a ceramic material to which has been added ammonium alginate as a plasticizing and bonding material.

7. A ceramic composition comprising a ceramic material to which has been added an alginate as a plasticizing and bonding material.

8. A ceramic composition comprising a ceramic material to which has been added an alginate in paste form.

9. In a ceramic composition of the class described, the combination with ceramic material of feeble plasticity, of an alginate derived from kelp.

10. A ceramic composition of the class described, comprising, in combination, kyanite and an alginate.

11. The process of rendering plastic a ceramic composition, consisting in adding an alginate paste thereto.

12. The process of rendering plastic a ceramic composition, which consists in adding ammonium alginate paste to ceramic materials.

13. The process of preparing a ceramic material which lies in treating the same with a marine alginate in pasty form to render the composition plastic.

14. The process of producing a plastic ceramic composition consisting in adding a pasty alginate to moist comminuted ceramic material and mixing same.

In testimony whereof I affix my signature.

THOMAS S. CURTIS.